Nov. 28, 1967 C. B. BURCKHARDT 3,355,655

FREQUENCY TRIPLER APPARATUS WITH ISOLATION

Filed Aug. 17, 1965 2 Sheets-Sheet 1

INVENTOR
C. B. BURCKHARDT
BY Arthur J. Torsiglieri
ATTORNEY 3,355,655

FREQUENCY TRIPLER APPARATUS WITH ISOLATION

Christoph B. Burckhardt, Berkeley Heights, N.J., assignor to Bell Telephone Laboratories, Incorporated, New York, N.Y., a corporation of New York Filed Aug. 17, 1965, Ser. No. 480,280
7 Claims. (Cl. 321—69)

This invention relates to frequency multipliers, and more particularly, to devices for stabilizing the operation of frequency triplers.

Frequency multipliers are well known and rather widely used devices for generating high frequency electromagnetic waves from lower frequency sources. A simple single-stage multiplier includes a nonlinear device such as a varactor diode for generating harmonic frequencies in response to an input frequency, and an output filter for passing a particular desired higher frequency harmonic. If the selected harmonic is some integral multiple of three, the multiplier is referred to herein as a frequency tripler. In many applications, frequency multipliers are used in cascade to form a multiplier chain for successively multiplying the frequency of the input energy.

Most present microwave frequency multiplier chains include an isolator behind the output of every second or third multiplier stage for providing impedance isolation. Because of unavoidable load impedance variations in the multiplier stages, such isolation is required to avoid spurious oscillation instabilities which would result from input and load impedance mismatches. Isolator devices are not, however, readily available at all frequencies, particularly the lower frequencies. Further, they add to the bulk and expense of the multiplier apparatus. As is pointed out in the patent of J. W. Gewartowski, issued July 4, 1967, assigned to Bell Telephone Laboratories, many of these difficulties can be avoided by using a 90 degree hybrid junction in each multiplier stage for providing inherent isolation. The Gewartowski apparatus works quite well with frequency multipliers which give an even order multiplication, i.e., doublers, quadruplers, etc.; however, rather extensive modifications, which tend to increase its bulk and expense, are required if it is to be used with frequency triplers.

Accordingly, it is an object of this invention to provide frequency tripler apparatus which inherently includes isolation between its output and its input terminals.

More specifically, it is an object of this invention to provide frequency tripler apparatus having an input impedance that is essentially independent of its load impedance.

These and other objects of the invention are attained in a frequency tripler circuit comprising three frequency tripler devices connected in parallel between three output ports of a coupler network and a load. The coupler network has an input port and two terminated ports in addition to its three output ports. Transmission channels are provided by the network from the input port and each of the terminated ports to each of the three output ports. Input energy is distributed equally from the input port to each of the three output ports.

In the preferred embodiment, the three transmission channels from the input port to the three output ports provide phase shifts of zero degrees, 120 degrees, and 240 degrees, respectively. The three channels from one of the terminated ports to the three output ports provide phase shifts of 240 degrees, 120 degrees, and zero degrees, respectively, while the three channels from the other terminated port each provide phase shifts of 120 degrees. The phase shifts provided by these transmission channels are effectively trebled by the three frequency tripler devices, that is, they are multiplied by $3n$, where $n$ is an integer. Under these conditions, all of the input energy will be in phase at the load. If, however, any energy is reflected from the load as a result of an impedance mismatch, equal reflection from each of the three nonlinear devices will occur. The three reflected components will arrive back at the input port through three transmission channels with respective relative phase angles of zero degrees, 240 degrees, and 120 degrees. Since these components will be of equal magnitude, their vector sum will be zero and they will therefore cancel out at the input port. Reflected energy arriving at the two terminated ports will either be canceled out or be in phase for dissipation by the matched termination without reflection. A coupler network having these characteristcis is realizable and lossless.

It will be appreciated that, with the arrangement described, variations in load impedance do not affect the input impedance. Hence, spurious energy is not reflected from the input, and the source always delivers energy to the same impedance. This is particularly important if the source is an earlier frequency multiplier stage which depends on a constant load impedance for stable operation.

From the functional point of view, my inventive concept requires (1) that the input energy be divided substantially equally among the three output ports, (2) that the three energy components arrive at the load substantially in phase for minimizing reflection at the load, and (3) that any reflected energy arrive at the input port in three essentially equal energy components that are mutually substantially 120 degrees out of phase. In addition to the preferred embodiment, an alternative coupler network will be described which meets the above requirements. Specific design considerations for the construction of a suitable coupler network will also be described.

These and other objects and features of the invention will be better appreciated from a consideration of the following detailed description, taken in conjunction with the accompanying drawing, in which.

Figure 1:
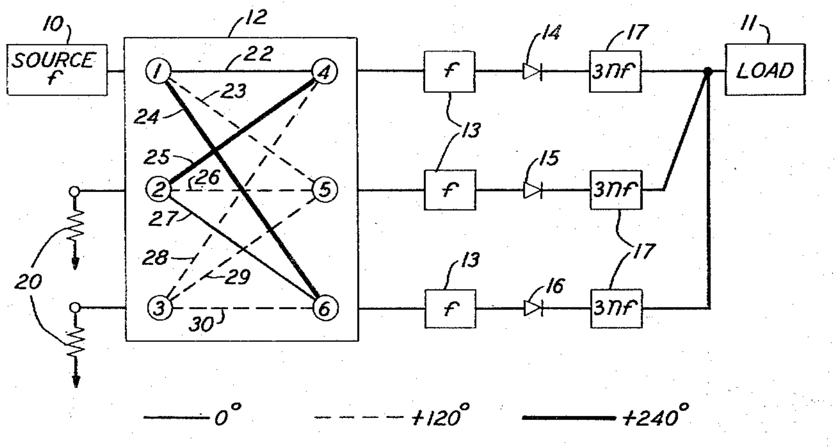
FIG. 1 is a block diagram of a frequency multiplier circuit in accordance with one embodiment of the invention.

Referring now to FIG. 1, there is shown a block diagram of a frequency multiplier for multiplying the frequency of electrical energy from a source 10 and for transmitting the multiplied frequency to a load 11. The frequency multiplier comprises a coupler network 12, band pass filters 13, nonlinear devices 14, 15, and 16, and band pass filters 17. The coupler network 12 has six ports numbered 1 through 6, as is customary in the art. Port 1 of the coupler network is an input port and is connected to the source 10. Ports 2 and 3 are terminated ports and are connected to terminating impedances 20. Ports 4, 5, and 6 are output ports and are connected respectively to nonlinear devices 14, 15, and 16 through filters 13. The nonlinear devices 14, 15, and 16 are connected in parallel to the load 11 by way of the band pass filters 17.

The specific purpose of the apparatus of FIG. 1 is to multiply the frequency $f$ of the input signal energy by an integral multiple of three. The coupler network 12 divides the input energy equally into three components which are delivered to nonlinear devices 14, 15, and 16 by way of band pass filters 13. Filters 13 have a pass band at frequency $f$, their purpose being merely to reject frequencies outside of the signal band. The nonlinear devices 14, 15, and 16 generate output currents at harmonic frequencies of the input frequency $f$, as is known in the art. Band pass filters 17 pass the desired harmonic of the input frequency, but reject all other frequencies, particularly the frequency $f$, so that the frequency delivered to the load 11 is some predetermined multiple of the input frequency $f$. In the apparatus of FIG. 1, the band pass filters 17 are tuned to a frequency which is an integral multiple of three times the input frequency $f$; the frequency of the energy delivered to the load is then $3nf$, where $n$ is an integer. Idler circuits may be incorporated into the bandpass filters 13 and 17, as is known in the art. An idler circuit is a circuit which permits current flow at a frequency other than the input or output frequency but which does not dissipate any energy except for unavoidable losses. Frequency multipliers which are designed to deliver output frequencies of an integral multiple of three times the input frequency are referred to herein as frequency triplers.

In accordance with the invention, the coupler network 12 is constructed to isolate the source 10 from the load 11, so that variations of the impedance of load 11 do not cause input impedance mismatches with resulting instabilities. This is accomplished by providing transmission channels of appropriate phase shift from each of the ports 1, 2, and 3, to each of the output ports 4, 5, and 6. The phase shifts of each of the different transmission channels is denoted by the legend on the bottom of FIG. 1. Input port 1 is connected to output ports 4, 5, and 6 by transmission channels 22, 23, and 24 which provide respective phase shifts of zero degrees, 120 degrees and 240 degrees; terminated port 2 is connected to ports 4, 5, and 6 by transmission channels 25, 26, and 27 which provide respective phase shifts of 240 degrees, 120 degrees, and zero degrees; terminated port 3 is connected to the output ports by transmission channels 28, 29, and 30 which each provide phase shifts of 120 degrees. Input energy from port 1 is divided substantially equally among the three channels 22, 23, and 24.

As will be shown later, all of the energy delivered to the load by devices 14, 15, and 16 arrives at the load in phase. Any energy reflected from the load 11 due to an output impedance mismatch will cause identical reflections from the three nonlinear devices 14, 15, and 16. Energy reflected from the nonlinear devices will arrive at port 1 on transmission channels 22, 23, and 24 at relative phase angles of zero degrees, 240 degrees, and 120 degrees, respectively. With these relative phase angles, the reflected energy will cancel out at port 1 and will therefore not affect the input impedance. The reader may verify this by drawing a graph having equal vectors at zero degrees, 120 degrees, and 240 degrees; equal vectors at these three angles give a vectorial sum of zero. Reflected energy components arrive at port 2 in phase, and are dissipated by termination 20 without further reflection. At port 3, the reflected energy arrives with relative phase angles of 120 degrees, 240 degrees, and zero degrees, and is therefore mutually destructive as at port 1.

In order to verify the relative phase shifts of reflected energy in the transmission channels 22–30 as described above, consider next the various transmission paths from the source 10 through the respective nonlinear devices 14, 15, and 16, to the load 11. Energy traveling from port 1 to the load by way of transmission channel 22, port 4, and device 14 does not experience a phase shift; if energy is reflected from the nonlinear device 14 it arrives back at port 1 with a relative phase angle of zero degrees. Energy traveling to port 5 by way of transmission channel 23 is shifted in phase by 120 degrees. When this energy travels through device 15, its frequency is multiplied by a factor of $3n$ and so its phase shift is likewise multiplied by $3n$. Assuming that $n$ is equal to 1, so that the frequency is multiplied by a factor of 3, the energy will have a relative phase angle at the load 11 of 360 degrees, which is the equivalent of a phase angle of zero degrees. If energy is reflected from the nonlinear device 15, it again experiences a 120 degree phase shift on its return path on transmission channel 23 and appears at port 1 with a relative phase angle of 240 degrees. Energy traveling from port 1 on transmission channel 24 is shifted by 240 degrees.

When its frequency is multiplied by a factor of 3 by device 16 it appears at the load with a phase angle of 720 degrees, which is again the equivalent of a phase angle of zero degrees. If energy is reflected from device 16, its phase is again shifted by transmission channel 24 and it appears at port 1 with a relative phase angle of 480 degrees, which is the equivalent of 120 degrees. It should be noted that all of the energy arriving at the load 11 has the same relative phase angle so that no energy is reflected from the load due to any phase difference from the three devices 14, 15, and 16. Any phase angle or phase shift given herein is the equivalent to that number plus or minus an integral multiple of 360 degrees.

Examination of the paths leading to terminated ports 2 and 3 easily shows that reflected energy arriving at these ports have the relative phase angles described above. Energy traveling from port 1 on channel 22 that is reflected by device 14 travels to port 2 via channel 25, and arrives at port 2 with a relative phase angle that is numerically equal to the sum of the phase shifts of channels 22 and 25, namely, 240 degrees. Reflected energy arriving at port 2 via port 1, transmission channel 23, port 5, device 15, port 5, and channel 26, has a relative phase angle of 120 degrees plus 120 degrees, or 240 degrees. As another example, consider energy reflected by device 16 to port 3. It travels on transmission channel 24 (240 degree phase shift), through port 6 to device 16, back through port 6 and transmission channel 30 (120 degree phase shift) to arrive with a relative phase angle of 360 degrees, the equivalent of zero degrees.

Consider next the construction of the coupler network 12 to give equal energy division and the appropriate phase shifts shown in FIG. 1. The scattering matrix [S] of network 12 is given by:

$$[S]=\frac{1}{\sqrt{3}}\begin{bmatrix} 0 & 0 & 0 & 1 & e^{j2\pi/3} & e^{j4\pi/3} \\ 0 & 0 & 0 & e^{j4\pi/3} & e^{j2\pi/3} & 1 \\ 0 & 0 & 0 & e^{j2\pi/3} & e^{j2\pi/3} & e^{j2\pi/3} \\ 1 & e^{j4\pi/3} & e^{j2\pi/3} & 0 & 0 & 0 \\ e^{j2\pi/3} & e^{j2\pi/3} & e^{j2\pi/3} & 0 & 0 & 0 \\ e^{j4\pi/3} & 1 & e^{j2\pi/3} & 0 & 0 & 0 \end{bmatrix} \quad (1)$$

The use of a scattering matrix is fairly common in the art, and is described, for example, in the book, "Principles of Microwave Circuits," by Montgomery, Dicke, and Purcell, McGraw-Hill Book Company, Inc., 1948. The scattering matrix describes the coupling between the various ports with the rows and columns of the matrix representing successive ports. For example, row 1, column 5 shows the phase shift between port 1 and port 5; this factor multiplied by $1/\sqrt{3}$ is indicative of energy coupling between the ports. It can be shown that the scattering matrix of Equation 1 is symmetrical and unitary, which indicates that the coupler network 12 is realizable and lossless. The scattering matrix also demonstrates that port 1 is always matched as long as the impedances connected to ports 4, 5, and 6 are identical. Because of equal power division, a mismatch at the load causes equal mismatches at the ports 4, 5, and 6; since the impedances of the output ports are always identical, port 1 has a constant, matched impedance independent of the impedance of the load, when ports 2 and 3 are terminated by matched loads.

An admittance matrix [Y] for giving the desired characteristics has been computed from the scattering matrix of Equation 1:

$$[Y]=j\begin{bmatrix} 0.5774 & -1.16 & 0 & -0.667 & -0.667 & 1.33 \\ -1.16 & 0.5774 & 0 & 1.33 & -0.667 & -0.667 \\ 0 & 0 & -0.5774 & -0.667 & -0.667 & -0.667 \\ -0.667 & 1.33 & -0.667 & -0.5774 & 0 & -1.16 \\ -0.667 & -0.667 & -0.667 & 0 & -0.5574 & 0 \\ 1.33 & -0.667 & -0.667 & -1.16 & 0 & 0.5774 \end{bmatrix} \quad (2)$$

Figure 2:
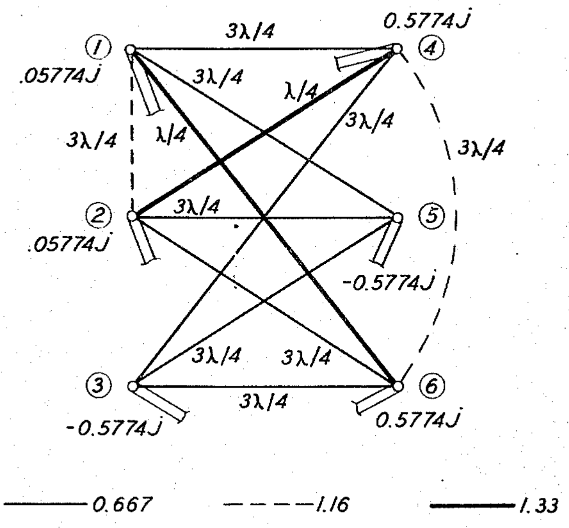
FIG. 2 is a schematic representation of a coupler network which may be used in the circuit of FIG. 1.

A possible synthesis of the admittance matrix of Equation 2 into a specific circuit design is exemplified by the transmission line configuration of FIG. 2. The details of the synthesis procedure for realizing such a configuration are described, for example, in section 12.21 of the aforementioned Montgomery et al. book. The electrical lengths of each of the transmission lines of FIG. 2 are designated in terms of the wavelength $\lambda$ at the frequency $f$, in accordance with customary notation. Likewise, at each of the ports 1–6 there is located a stub which is short- or open-circuited with the relative admittance as seen from the respective port being indicated. The relative characteristic admittance of each transmission line is indicated by the legend at the bottom of the figure. In this type of synthesis procedure and schematic diagram, the transmission lines shown are intended to be coaxial cables or the equivalent.

Figure 4:
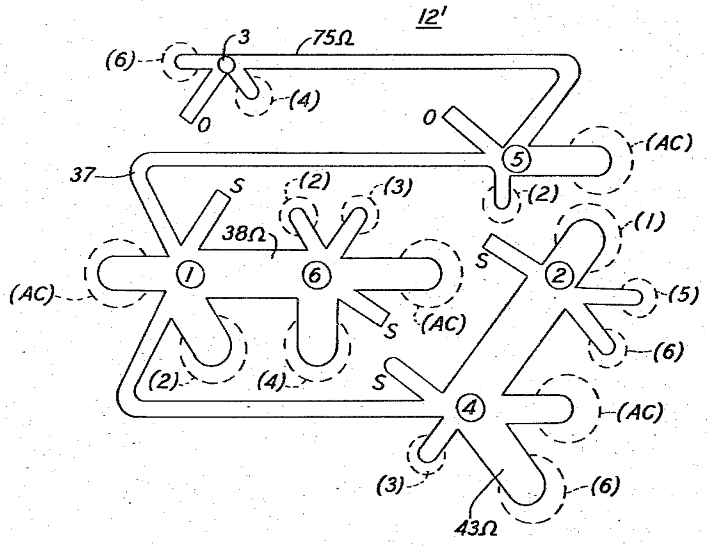
FIG. 4 is a top view of the active conductor of the coupler network of FIG. 3.
Figure 3:
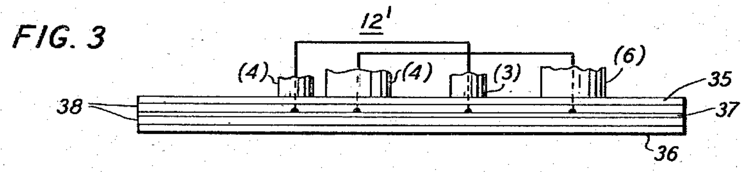
FIG. 3 is a partially schematic side view of one embodiment of the coupler network of the diagram of FIG. 2.

A practical construction of the transmission line configuration of FIG. 2 is shown in FIGS. 3 and 4 for an input frequency of 2 kilomegacycles per second. As shown in FIG. 3, part of a coupling matrix 12′ is defined by a strip transmission line comprising a pair of ground conductors 35 and 36, and an active conductor 37 which is insulated from the ground conductors by dielectric slabs 38 of a relative dielectric constant of 2.32. The configuration of the active conductor 37 is shown in FIG. 4. The various ports 1 through 6 of FIG. 1 are shown in FIG. 4 by the encircled numbers 1 through 6. Open-circuited stubs of the ports are shown by active conductor extensions designated by an "O" while short-circuited stubs are indicated by extensions labelled "S." It is to be understood that the short-circuited stubs are connected to both ground conductors 35 and 36, while the open-circuited stubs are connected to neither of the ground conductors.

Interconnections between the various ports are either made by the active conductor 37, or by coaxial cables which are indicated on FIG. 4 by broken circles. The ports to which the various coaxial cables are connected are indicated by the numbers in parenthesis. For example, at port 3, two coaxial cables interconnect port 3 with ports 6 and 4, respectively. Coaxial cable access lines to the ports 1, 4, 5, and 6 are indicated by broken circles (AC). The matched terminations at ports 2 and 3 may be incorporated in this network as disk resistors between the active conductor and the two ground conductors.

The manner in which the coaxial cables interconnect the various ports is shown in FIG. 3. The coaxial lines interconnecting ports 6 and 4, and ports 4 and 3, are indicated schematically on FIG. 3 for purposes of illustration. The other coaxial cables which connect various ports have, for reasons of clarity, not been shown in FIG. 3.

The circuit of FIG. 4 is drawn approximately to scale with the strip line impedances between ports 3 and 5, 1 and 6, and an extension of port 4 being shown on the drawing. The impedances of the other strip line interconnections can be computed from their widths by tables known in the art. The varying diameters of the coaxial cables seen in FIG. 3 are intended to represent different impedances of these cables. In this particular illustration, the coaxial cables interconnecting ports 2 and 5, 2 and 6, 3 and 4, and 3 and 6, each have impedances of 75 ohms, while the coaxial cables interconnecting ports 1 and 2, and 4 and 6, have impedances of 43 ohms. The access cables each have impedances of 50 ohms. The lengths of the various interconnections of FIG. 4 conform to the lengths shown in FIG. 2 in terms of the wavelength of the frequency of operation.

It is to be emphasized that FIG. 2 represents only one embodiment satisfying the admittance matrix of Equation 2, and that FIGS. 3 and 4 represent only one of numerous implementations of the schematic diagram of FIG. 2. From this it can be appreciated that numerous circuits could be constructed which would divide energy equally from the input port to the three outport ports and which would provide transmission channels having the required phase shifts within the coupler matrix 12 of FIG. 1.

The nonlinear devices 14, 15, and 16 of FIG. 1 have been shown as being diodes mainly because varactor semiconductor diodes are particularly convenient for microwave frequency multiplication; other known nonlinear devices could be substiuted for them. It should also be pointed out that the transmission channels 25, 26, and 27 could be interchanged with transmission channels 28, 29, and 30. This would result in reflectionless dissipation of energy at port 3, rather than port 2, and cancellation of reflected energy at port 2, rather than port 3.

Figure 5:
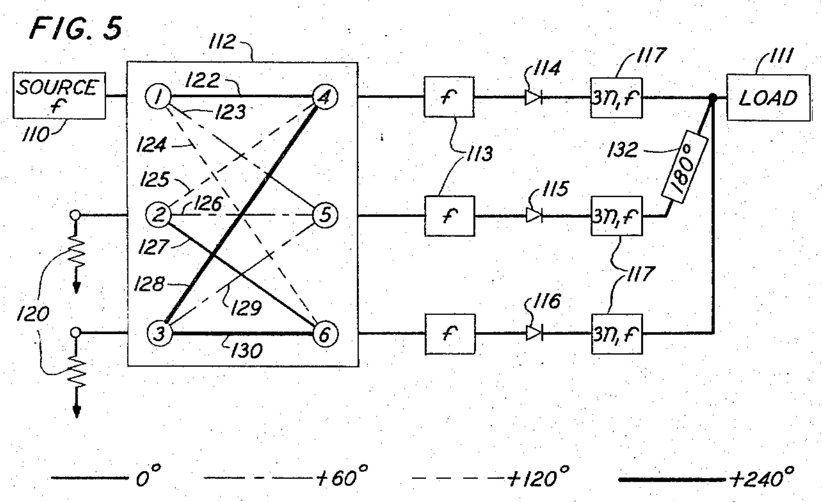
FIG. 5 is a block diagram of another embodiment of the invention.

From the foregoing, it can be appreciated that the inventive concept requires (1) that the input energy at port 1 be divided substantially equally among the three output ports, (2) that the frequency multiplied energy arrived at load 11 substantially in phase, (3) that any reflected energy from the load be appropriately shifted in phase so that the three energy components arrive at the input port 1 at relative phase angles that are mutually substantially 120 degrees apart. These requirements can be met by the circuit of FIG. 5, which is an alternative embodiment of the invention. Reference numbers of the components of FIG. 5 are equal to the reference numbers of corresponding components of FIG. 1 plus 100. The phase shifts of transmission channels 122–130 of coupler matrix 112 are indicated by the legend at the bottom of the figure.

At port 1 energy is divided equally between transmission channels 122, 123, and 124, and is multiplied by nonlinear devices 114, 115, and 116. Filters 117 pass a harmonic frequency $3n_1f$, where $n_1$ is an odd integral number such as 1, 3, or 5. As in FIG. 1, energy traveling by way of transmission channel 122, port 4, and device 114 is not shifted in phase. The sixty degree phase shift of transmission channel 123 is multiplied by $3n_1$ by device 115 which gives it a relative phase angle of 180 degrees. Included between the device 115 and the load 111 is a 180 degree phase shifter 132 which shifts the phase of the incoming energy to zero degrees. The 120 degree phase shift on transmission channel 124 is multiplied by $3n_1$ by the frequency tripler device to give a phase angle at the load of zero degrees.

Energy which is reflected back from device 116 due to a reflection from the load travels through transmission channel 124 to arrive at port 1 with a relative phase angle of 240 degrees. Energy reflected from device 115 arrives at port 1 with a relative phase angle of 120 degrees and energy reflected from device 114, due to a reflection from the load, finally has zero degrees relative phase angle. Hence, we see that all of the energy arriving at the load 111 is in phase, and all the reflected energy arriving at port 1 is mutually 120 degrees out of phase for cancellation in accordance with the invention. Examination of the phase shifts of the other paths will show that reflected energy is canceled out at port 3 and is all in phase at port 2 for reflectionless termination. The scattering matrix of coupler matrix 12 is given by the following equation:

$$[S]=\frac{1}{\sqrt{3}}\begin{bmatrix} 0 & 0 & 0 & 1 & e^{j\pi/3} & e^{j2\pi/3} \\ 0 & 0 & 0 & e^{j2\pi/3} & e^{j\pi/3} & 1 \\ 0 & 0 & 0 & e^{j4\pi/3} & e^{j\pi/3} & e^{-j2\pi/3} \\ 1 & e^{j2\pi/3} & e^{j4\pi/3} & 0 & 0 & 0 \\ e^{j\pi/3} & e^{j\pi/3} & e^{j\pi/3} & 0 & 0 & 0 \\ e^{j2\pi/3} & 1 & e^{-j2\pi/3} & 0 & 0 & 0 \end{bmatrix} \quad (3)$$

It can be shown that this scattering matrix is symmetrical and unitary and is therefore realizable. An appropriate circuit design can therefore be made using the techniques described above.

Note that the transmission channels 123, 126, and 129 leading to output port 5 all eventually transmit energy to the 180 degree phase shifter 132. Examination of the circuit shows that all of the requirements of the invention could be attained by eliminating phase shifter 132 and increasing the phase shift of channels 123, 126, and 129 from 60 degrees to 240 degrees.

Alternatively, if the frequency is multiplied by $3n_2$, where $n_2$ is an even integer, proper operation is achieved by merely eliminating the phase shifter 132. A 180 degree phase shift is the equivalent of a polarity change. Hence, the following generalization can be made: the polarities at any of the output ports may be reversed provided that compensation is made, (1) by multiplying the input frequency only by $3n_2$, where $n_2$ is an even integer, or (2) by multiplying the frequency by $3n_1$ and by making another polarity reversal elsewhere in the transmission path. The phase shifter 132 may be constructed in any of various ways known in the art.

The foregoing discussion is only illustrative of some implementations that can be made of my inventive concept. Various other modifications and embodiments may be made without departing from the spirit and scope of the invention.

What is claimed is:

1. A frequency multiplier system comprising:
a source of signal energy of a first frequency;
a coupler network having a first input port connected to the source, second and third terminated ports, and fourth, fifth, and sixth output ports;
a load;
means comprising first, second, and third nonlinear devices connected to the load for multiplying the first frequency by an integral multiple of three;
the first, second, and third devices being respectively connected to the fourth, fifth, and sixth output ports;
each of the first, second, and third ports being coupled to each of the fourth, fifth, and sixth output ports through signal transmission channels;
the transmission channels coupling the first port to the fourth, fifth, and sixth ports providing phase shifts of zero degrees, 120 degrees, and 240 degrees, respectively.

2. The frequency multiplier system of claim 1 wherein:
the signal conductive channels interconnecting the second port and the fourth, fifth, and sixth ports, respectively provide phase shifts of 240 degrees, 120 degrees, and zero degrees;
and the signal conductive channels interconnecting the third port and the fourth, fifth, and sixth ports, each provide phase shifts of 120 degrees.

3. In combination:
a source of signal frequency energy;
a coupler network having a first input port connected to the source, second and third terminated ports, and fourth, fifth, and sixth output ports;
said coupler network providing nine transmission channels which interconnect the first, second, and third ports, respectively, with each of the fourth, fifth, and sixth ports;
the fourth, fifth, and sixth ports each being respectively connected to a separate frequency tripler means;
the frequency tripler means being connected to a load, whereby three distinct transmission paths are established from each of the first, second, and third ports, through the fourth, fifth, and sixth ports, the frequency tripler means, and hence to the load;
the three transmission paths from the first port providing respectively phase shifts such that electrical energy which is reflected back to the first port arrives at the first port from the load at relative phase angles of zero degrees, 120 degress, and 240 degrees, respectively, whereby such reflected energy is mutually destructive at the first port;
the other transmission paths providing respective phase shifts such that the wave energy reflected from the load to the second and third ports is either in phase or mutually destructive.

4. The combination of claim 3 wherein:
the three transmission channels interconnecting the first port and the fourth, fifth, and sixth ports, respectively provide phase shifts of zero degrees, 60 degrees, and 120 degrees;
the three transmission channels interconnecting the second port and the fourth, fifth, and sixth ports, respectively provide phase shifts of 120 degrees, 60 degrees, and zero degrees;
and the transmission channels interconnecting the third port and the fourth, fifth, and sixth ports, respectively provide phase shifts of 240 degrees, 60 degrees, and 240 degrees.

5. In combination:
a source of signal frequency energy;
signal input means for equally dividing the signal energy into three components;
a load;
three transmission paths interconnecting the input means and the load for transmitting the three energy components;
frequency multiplier means included in each of the transmission paths for multiplying the frequency of each of the energy components by an integral multiple of 3;
said load being susceptible to impedance variations, whereby part of each of the energy components may be reflected back toward the input means;
phase shifting means included in one of the three transmission paths for shifting the phase of reflected energy by 120 degrees;
and phase shifting means included in one other transmission path for shifting the phase of reflected energy by 240 degrees, whereby the three components of any reflected energy arrive at the input means at relative phase angles of zero degrees, 120 degrees, and 240 degrees, and therefore cancel out;
and terminating means coupled to the three transmission paths.

6. In combination:
a source of signal frequency energy;
a load;
means comprising first, second, and third nonlinear dedevices connected to the load for multiplying the frequency of the signal energy by an integral multiple of three;
a coupler network having first, second, third, fourth, fifth, and sixth ports;
the first port being connected to the source, the fourth port being connected to the first nonlinear device, the fifth port being connected to the second nonlinear device, the sixth port being connected to the third nonlinear device, and the second and third ports being terminated;
said coupler network having the following scattering matrix:

$$[S]=\frac{1}{\sqrt{3}}\begin{bmatrix} 0 & 0 & 0 & 1 & e^{j2\pi/3} & e^{j4\pi/3} \\ 0 & 0 & 0 & e^{j4\pi/3} & e^{j2\pi/3} & 1 \\ 0 & 0 & 0 & e^{j2\pi/3} & e^{j2\pi/3} & e^{j2\pi/3} \\ 1 & e^{j4\pi/3} & e^{j2\pi/3} & 0 & 0 & 0 \\ e^{j2\pi/3} & e^{j2\pi/3} & e^{j2\pi/3} & 0 & 0 & 0 \\ e^{j4\pi/3} & 1 & e^{j2\pi/3} & 0 & 0 & 0 \end{bmatrix}$$

7. In combination:
a source of signal frequency energy;
a load;
means comprising first, second, and third nonlinear devices connected to the load for multiplying the frequency of the signal energy by a multiple of 3;
a coupler network having first, second, third, fourth, fifth, and sixth ports;

the first port being connected to the source, the fourth port being connected to the first nonlinear device, the fifth port being connected to the second nonlinear device, the sixth port being connected to the third nonlinear device, and the second and third ports being terminated;

said coupler network having the following scattering matrix:

$$[S]=\frac{1}{\sqrt{3}}\begin{bmatrix} 0 & 0 & 0 & 1 & e^{j\pi/3} & e^{j2\pi/3} \\ 0 & 0 & 0 & e^{j2\pi/3} & e^{j\pi/3} & 1 \\ 0 & 0 & 0 & e^{j4\pi/3} & e^{j\pi/3} & e^{-j2\pi/3} \\ 1 & e^{j2\pi/3} & e^{j4\pi/3} & 0 & 0 & 0 \\ e^{j\pi/3} & e^{j\pi/3} & e^{j\pi/3} & 0 & 0 & 0 \\ e^{j2\pi/3} & 1 & e^{-j2\pi/3} & 0 & 0 & 0 \end{bmatrix}$$

References Cited

UNITED STATES PATENTS

| | | | |
|---|---|---|---|
| 3,091,743 | 5/1963 | Wilkinson | 333—9 |
| 3,121,847 | 2/1964 | Pakan | 333—9 |
| 3,329,884 | 7/1967 | Gewartowski | 321—60 |

OTHER REFERENCES

Principles of Microwave Circuits by Montgomery, Dicke and Purcell; Pub.: 1948 by McGraw-Hill Book Company; pages 449–450 relied upon.

Proc. of I.R.E.; June 1961, page 1075 relied upon.

JOHN F. COUCH, *Primary Examiner.*

G. GOLDBERG, *Assistant Examiner.*